United States Patent [19]
Dean

[11] Patent Number: 6,142,151
[45] Date of Patent: Nov. 7, 2000

[54] SPOOL VALVE FOR SWITCHING AIR FLOWS BETWEEN TWO BEDS

[75] Inventor: W. Clark Dean, Simsbury, Conn.

[73] Assignee: United Technologies Corporation, Windsor Locks, Conn.

[21] Appl. No.: 09/292,980

[22] Filed: Apr. 16, 1999

[51] Int. Cl.[7] .................................................. A62B 7/08
[52] U.S. Cl. .............................. 128/205.24; 128/202.26
[58] Field of Search ..................... 128/202.26, 205.24, 128/204.18; 96/122, 130, 133

[56] References Cited

U.S. PATENT DOCUMENTS 4,065,272  12/1977  Armond .
4,239,039  12/1980  Thompson ......................... 128/205.24
5,042,471   8/1991  Drews et al. ....................... 128/202.26

Primary Examiner—Harold Joyce
Attorney, Agent, or Firm—Schwartz & Weinrieb

[57] ABSTRACT

A dual-bed ventilation air regeneration system is adapted for use in conjunction with a ventilation or respiration air loop of an astronaut space suit wherein the ventilation loop includes inlet and outlet manifolds. A pair of chemical beds, having inlet and outlet manifolds, are provided for alternatively adsorbing carbon dioxide and water vapor deposits from the ventilation or respiration air, and for desorbing such deposits to the hard vacuum of space through spool valve housing vacuum ports. A single spool valve controls the fluidic connections between the ventilation air inlet and outlet manifolds, the chemical bed inlet and outlet manifolds, and the exhaust or vacuum ports. The spool valve also permits equalization of the chemical bed pressures and volumes during transition between chemical bed changeovers between the adsorbing and desorbing phases so as to save one-half the volume of air as compared to that which would otherwise be lost to space if such pressure equalization was not achieved. In addition, air which is utlizied to actuate the spool valve in its reciprocating movements is used to replenish air, within the ventilation loop, which was lost to vacuum during the previous desorbing cycle.

21 Claims, 9 Drawing Sheets

SPOOL VALVE FOR SWITCHING AIR FLOWS BETWEEN TWO BEDS

FIELD OF THE INVENTION

The present invention relates generally to any system comprising alternative cycling of vacuum and pressure states within a pair of chambers wherein a reduction in the amount of gas lost to vacuum is desirable, and more particularly to ventilation or respiration air regeneration systems wherein a new and improved spool valve control system, for use with a dual-bed ventilation or respiration air regeneration system, is adapted to be used upon a space vehicle, or alternatively, is adapted to be physically incorporated within, for example, an astronaut backpack so as to provide the vehicle cabin, or the astronaut space suit, with ventilation or respiratory air while eliminating carbon dioxide and water vapor from the ventilation system.

BACKGROUND OF THE INVENTION

In connection with conventional space vehicle or space suit ventilation or respiration air regeneration systems, ventilation or respiration air regeneration systems of the dual-bed or swing-bed type are known and have been successfully employed. In accordance with such systems, an air stream is directed or conveyed in an alternative manner so as to flow, for example, through a first chemical bed, wherein carbon dioxide and/or water vapor are adsorbed and thereby removed from the ventilation or respiratory air stream, while a second chemical bed, which was previously saturated with carbon dioxide and/or water vapor, is being substantially simultaneously regenerated or reconditioned as a result of the same to the vacuum of space whereby the carbon dioxide and/or water vapor deposits are discharged from the chemical bed into space under the differential pressure conditions. Subsequently, after a predetermined period of time, the air flow is effectively reversed such that the air stream is now directed or conveyed through the second, regenerated or reconditioned chemical bed while the first chemical bed, which is now saturated with carbon dioxide and/or water vapor deposits, is substantially simultaneously reconditioned or regenerated as a result of the exposure of the same to the vacuum of space. By repeating this dual-bed or swing-bed process at predetermined time intervals, the ventilation or respiratory air stream can be continuously processed while the chemical beds are alternatively regenerated or reconditioned.

A suitable valving arrangement or system is of course necessary to achieve the aforenoted type of alternative routing of the ventilation or respiratory air stream into and out from the two chemical beds, and conventionally, a series of two-way and/or three-way valves, electically sequenced by means of a suitable controller, has been heretofore employed. However, the complexity of such valving, and the piping or conduits defining the air stream paths interconnecting the various valve units, render these conventional systems large and heavy. In addition, the electrical power required to operate the valving is also considerably large. Still further, the amount of ventilation or respiratory air present within a space vehicle or a space suit is a limited resource which must be conserved as much as possible. Accordingly, in accordance with the aforenoted conventional dual-bed or swing-bed systems, the dumping of an entire bed volume of respiratory or ventilation air to the vacuum of space at regular intervals of time is undesirable.

A need therefore exists in the art for a new and improved valving system, and a method of operating the same, to be incorporated within a ventilation or respiration air regeneration system, wherein a single, multi-port spool valve can effect all necessary port connections between the air recirculation or ventilation system or loop, the two chemical beds of the dual-bed or swing-bed system, and the vacuum of space, and wherein, in addition, the two chemical beds are permitted to fluidically communicate with each other, while ventilation or respiratory air is bypassing both chemical beds, such that a bed pressure equalization process is established within the system. In this manner, ventilation or respiratory air within the chemical bed that was previously at cabin or suit pressure is permitted to flow into the chemical bed that was previously at vacuum pressure whereby such process minimizes or limits the subsequent loss of ventilation or respiratory air, to vacuum, to one-half the volume that would otherwise be lost during the entire chemical bed cycling process if such bed pressure equalization process was not achieved.

OBJECTS OF THE INVENTION

Accordingly, it is an object of the present invention to provide a new and improved dual-bed or swing-bed ventilation or respiratory air regeneration system which may be adapted for use upon a space vehicle or, alternatively and preferably, is adapted for physical incorporation within an astronaut backpack.

Another object of the present invention is to provide a new and improved dual-bed or swing-bed ventilation or respiratory air regeneration system which overcomes the various drawbacks characteristic of the prior art dual-bed or swing-bed ventilation or respiratory air regeneration systems.

An additional object of the present invention is to provide a new and improved dual-bed or swing-bed ventilation or respiratory air regeneration system wherein a single, multi-port spool valve can effect all necessary port connections between the air recirculation or ventilation system or loop, the two chemical beds of the dual-bed or swing-bed system, and the hard vacuum of space.

A further object of the present invention is to provide a new and improved dual-bed or swing-bed ventilation or respiratory air regeneration system wherein a single, multi-port spool valve can permit the two chemical beds to be fluidically connected to each other, while the ventilation or respiratory air is bypassing both chemical beds, such that a bed pressure equalization process is established within the system whereby such process minimizes or limits the subsequent loss of ventilation or respiratory air, to vacuum, to one-half the volume that would otherwise be lost during the entire chemical bed cycling process if such bed pressure equalization process was not performed.

It is also an object of the present invention to provide a new and improved dual-bed or swing-bed ventilation or respiratory air regeneration system wherein the single, multi-port spool valve is fluidically controlled or actuated in its reciprocating manner by means of an oxygen fluid flow which is also used to replenish that part of the ventilation or respiratory air which was contained within the ventilation or respiratory loop and which was previously dumped to vacuum during a desorbing portion of the chemical bed regeneration cycle.

SUMMARY OF THE INVENTION

The foregoing and other objectives are achieved in accordance with the teachings of the present invention through the provision of a dual-bed ventilation/respiratory air regeneration system which comprises first and second chemical beds, a spool valve housing within which a reciprocating spool valve is disposed, and a ventilation loop defined within, for example, the vehicle cabin or astronaut suit. The spool valve housing comprises inlet and outlet ports for fluidic connection to the ventilation loop, inlet and outlet ports for fluidic connection to each one of the chemical beds, and vacuum ports for fluidically connecting each one of the chemical beds to the vacuum of space. A supply of oxygen, through means of a pair of periodically actuated solenoid valves, is used to actuate the spool valve in a reciprocating manner. When the spool valve is disposed, for example, at a first extreme position of its reciprocating travel, a first one of the chemical beds is fluidically connected or exposed to the ventilation loop so as to be continuously exposed to the ventilation or respiratory air containing carbon dioxide and/or water vapor which is adsorbed upon the chemical bed, and the second one of the chemical beds is fluidically connected or exposed to the vacuum of space such that the carbon dioxide and/or water vapor components, previously deposited or adsorbed upon such chemical bed, are now desorbed from the bed and discharged to space. When the spool valve is disposed at a second opposite extreme position of its reciprocating travel, the fluidic connections of the chemical beds are effectively reversed whereby the second one of the chemical beds is now fluidically connected to the ventilation loop while the first chemical bed is fludically connected to the vacuum of space.

When the spool valve is disposed at a substantially centered position of its reciprocating travel stroke, the two chemical beds are permitted to be in fluidic communication with each other whereby air flows from a first one of the chemical beds that was just exposed to ventilation loop flow, and thereby adsorbing carbon dioxide and/or water vapor, to the second one of the chemical beds that was just, but no longer is, exposed to space vacuum whereby the air volumes and pressures within the two chemical beds are now equalized. In this manner, when the first chemical bed is then exposed to space vacuum in order to desorb its carbon dioxide and/or water vapor deposits, only one half of the bed volume of air is lost to space as opposed to an entire bed volume of air that would otherwise be lost or dumped to space if such a pressure equalization phase of the entire bed regeneration cycle was not incorporated within the bed regeneration cycle.

It is also noted that in accordance with another unique and novel feature of the present invention that a portion of the oxygen supply, which as has been noted hereinabove was utilized to actuate or drive the spool valve in its reciprocating mode, is also used at the end of a desorb phase of the bed regeneration cycle to replenish that part of the ventilation or respiratory air which was previously contained within the ventilation or respiratory loop and which was previously dumped or discharged to vacuum during the aforenoted desorbing portion of the chemical bed regeneration cycle.

BRIEF DESCRIPTION OF THE DRAWINGS

Various other objects, features, and attendant advantages will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
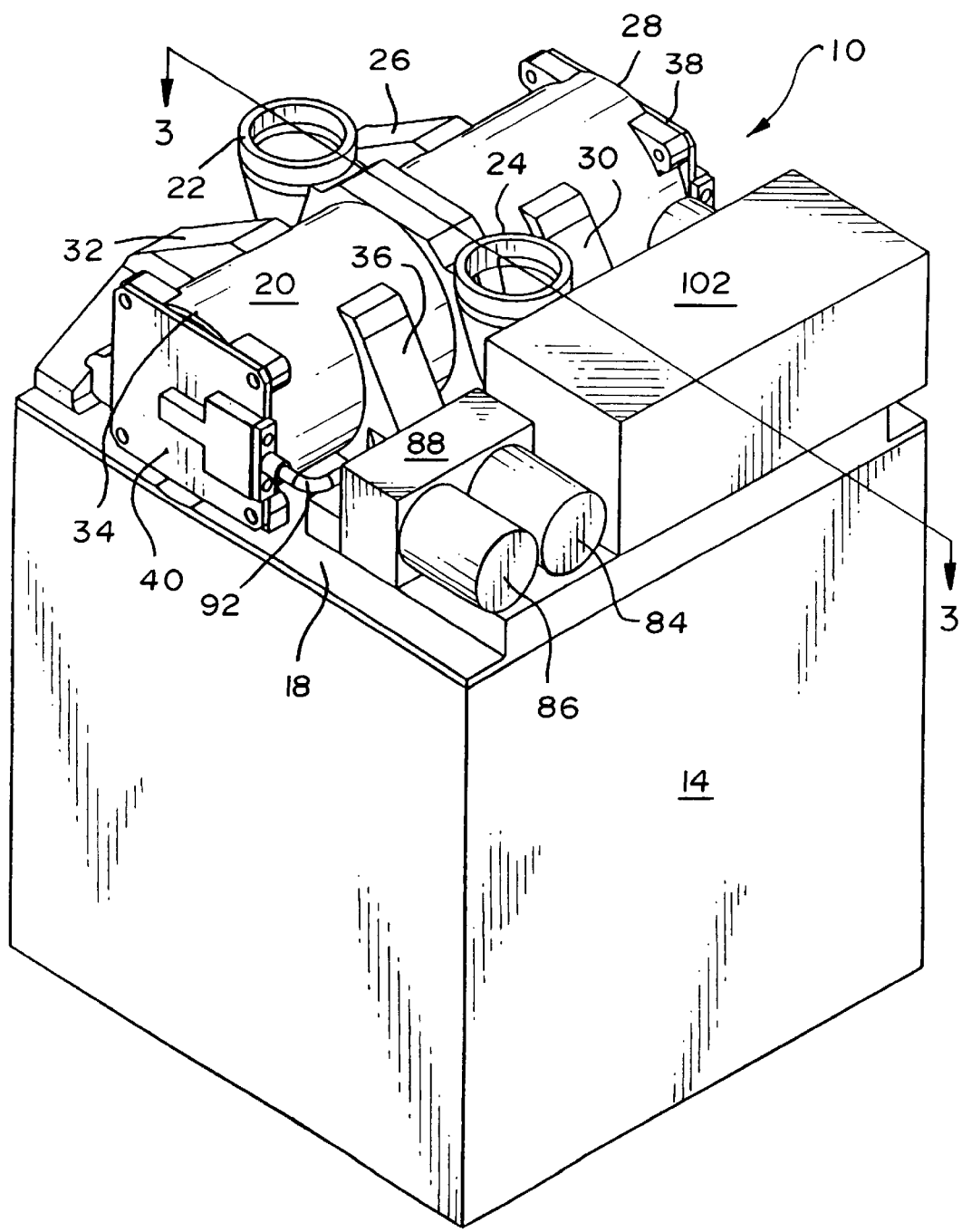
FIG. 1 is a perspective, external view of the new and improved spool valve-dual bed ventilation/respiratory regeneration system constructed in accordance with the teachings of the present invention and showing the cooperative parts thereof.
Figure 2:
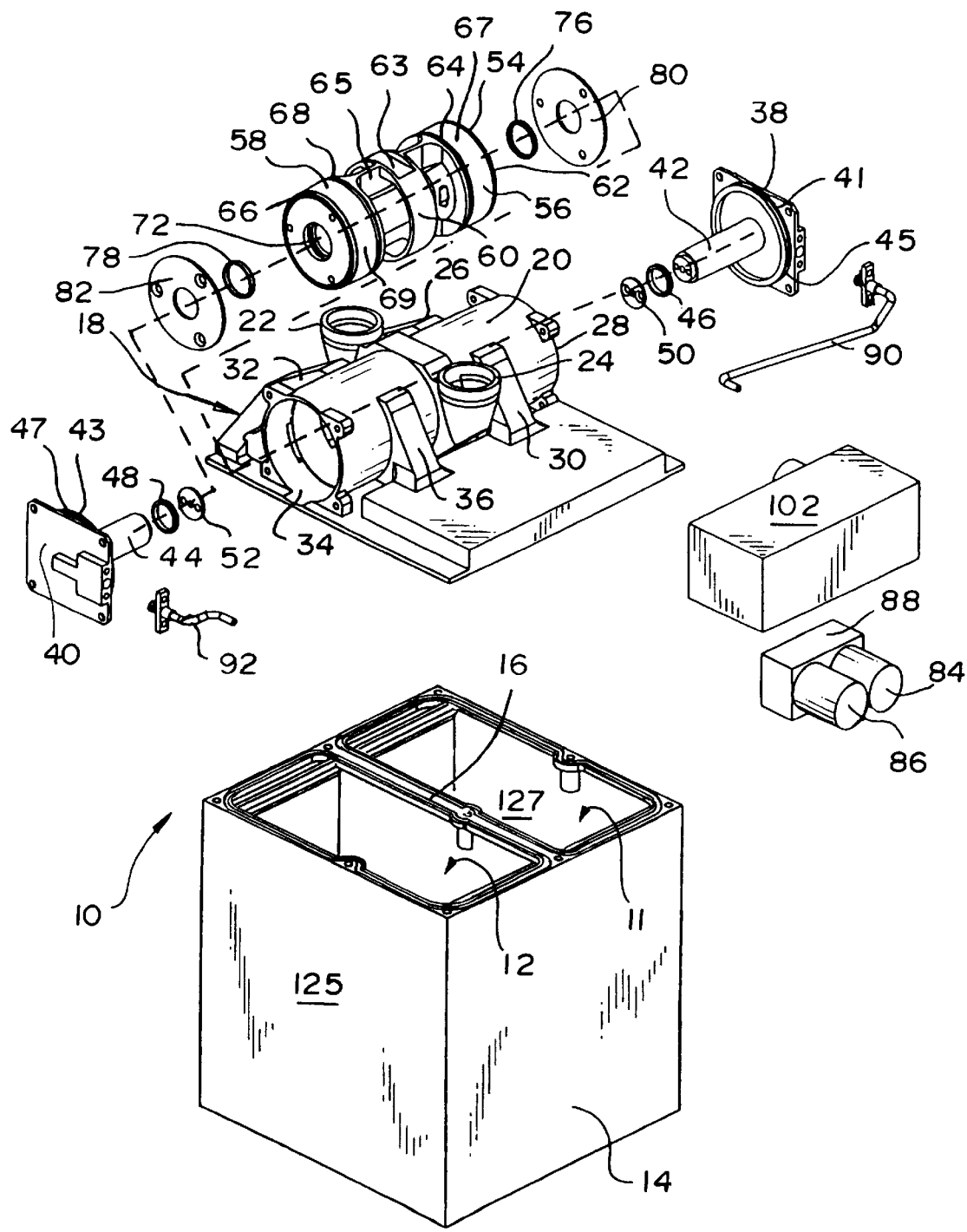
FIG. 2 is an exploded perspective view of the new and improved spool valve-dual bed ventilation/respiratory regeneration system shown in FIG. 1.

Referring now to the drawings, and more particularly to FIGS. 1 and 2 thereof, the new and improved spool valve-dual bed ventilation/respiration regeneration system, constructed in accordance with the teachings of the present invention, is disclosed so as to illustrate the various component parts thereof and is generally indicated by the reference character 10. While the present invention can comprise a ventilation or respiration system for use within a space vehicle, the present invention will be described as a ventilation or respiration system which is to be incorporated within an astronaut backpack for providing the astronaut's space suit with a ventilation or respiration system independent of a space vehicle or the like, that is, where the astronaut is not fluidically connected to, for example, a space vehicle by means of an umbilical cord or the like.

The spool valve-dual bed ventilation or respiration regeneration system 10 is seen to comprise a pair of chemical beds 11,12 which are housed within a canister 14 wherein the latter is provided within an internal dividing or partition wall 16 so as to isolate the chemical beds 11,12 from each other. The canister 14 may have the configuration of a rectangular solid or substantially that of a cube, and more particularly, may have a width dimension of six inches (6" or 154 mm), a length dimension of six inches (6"/154 mm), and a height dimension of eight inches (8"/203 mm), and the canister 14 may be formed as a cast aluminum structure. The top of the canister 14 is open, and a spool valve housing 18 is mounted atop the canister 14 so as to close the open top thereof. The spool valve housing 18 also comprises a cast aluminum structure and is seen to comprise a main cylinder member 20 and a plurality of air flow manifolds integrally incorporated within the cast housing structure 18.

More particularly, a ventilation air inlet manifold 22, which is adapted to receive ventilation or respiration air from the astronaut's space suit loop, is provided upon a first lateral side of the cylinder member 20 at an axially central region of the cylinder member 20, and a ventilation air outlet manifold 24, which is adapted to convey ventilation or respiration air back into the astronaut's space suit loop, is provided upon the second opposite lateral side of the cylinder member 20. An inlet manifold 26, for conducting ventilation or respiration air from the astronaut's space suit loop, through means of the ventilation air inlet manifold 22, into the first chemical bed 11 is provided upon the first lateral side of the cylinder member 20 at an axial position between the ventilation air inlet manifold 22 and a first end 28 of the cylinder member 20, and an outlet manifold 30, for conducting ventilation or respiration air out from the first chemical bed 11 and back into the astronaut's space suit loop, through means of the ventilation air outlet manifold 24, is provided upon the second opposite lateral side of the cylinder member 20. In a similar manner, an air inlet manifold 32, for conducting ventilation or respiration air from the astronaut's space suit loop, through means of ventilation air inlet manifold 22, into the second chemical bed 12 is provided upon the first lateral side of the cylinder member 20 at an axial position between the ventilation air inlet manifold 22 and a second opposite end 34 of the cylinder member 20, and an outlet manifold 36, for conducting ventilation or respiration air out from the second chemical bed 12 and back into the astronaut's space suit loop, through means of the ventilation air outlet manifold 24, is provided upon the second opposite lateral side of the cylinder member 20.

The opposite ends 28,34 of the cylinder 20 are open, and in order to fluidically seal the same, each open end 28,34 of the cylinder 20 has an end cap 38,40 respectively secured thereto by means of suitable fasteners, not shown. Each one of the end caps 38,40 is respectively provided with an axially inwardly extending piston 42,44, and the distal end of each piston 42,44 is provided with a split-ring seal member 46,48 which is respectively secured upon the distal end of the piston 42,44 by means of a suitable retainer 50,52 which is suitably secured to the distal end of the piston 42,44 by fasteners, not shown. Each end cap 38,40 is further provided with an O-ring seal member 41,43 which is respectively positioned within a seal groove 45,47 formed within each end cap 38,40.

Figure 3:
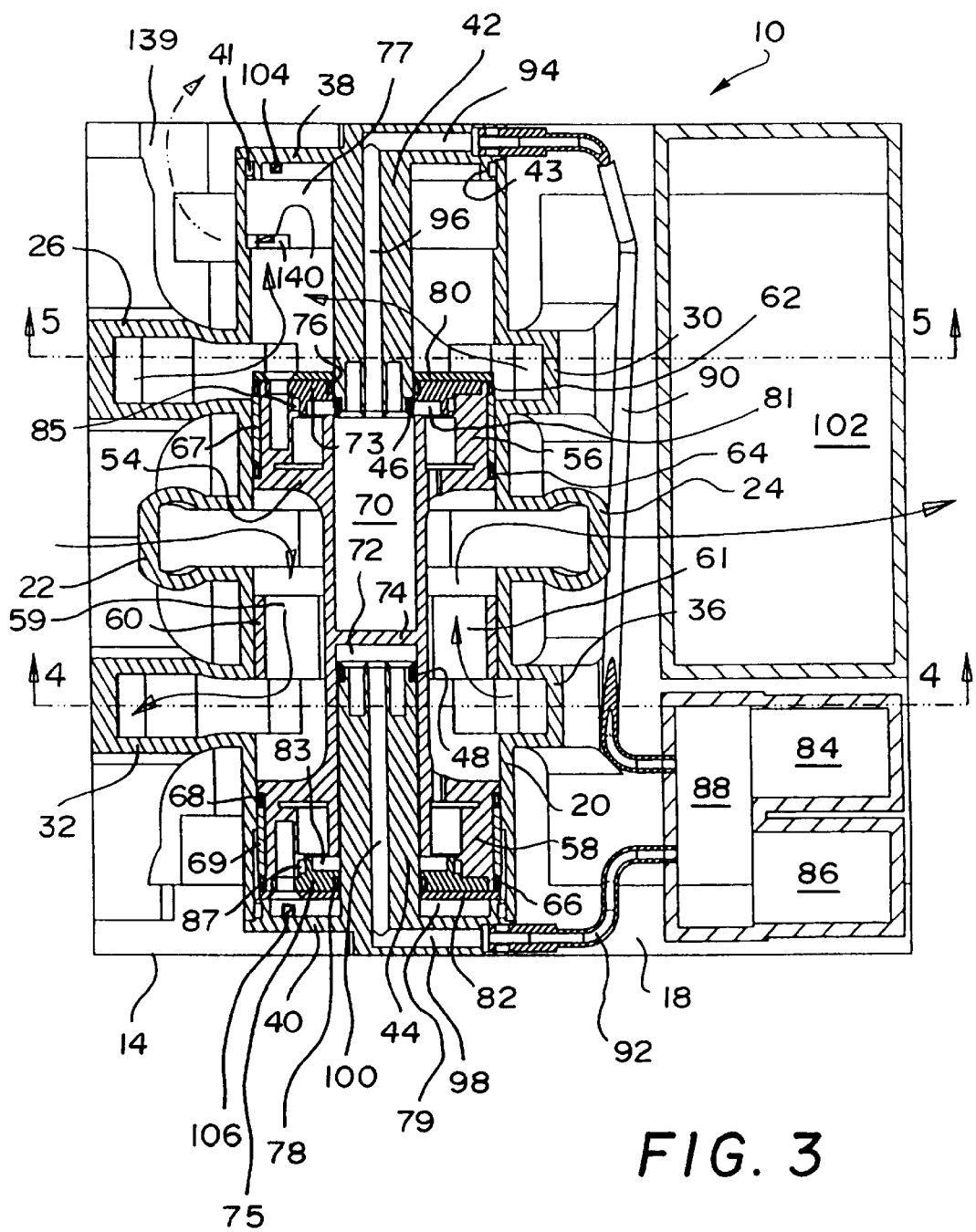
FIG. 3 is a horizontal cross-sectional view of the new and improved spool valve-dual bed ventilation/respiratory regeneration system shown in FIG. 1 as taken along the lines 3—3 of FIG. 1 in a plane containing the centerline of the spool valve.
Figure 4:
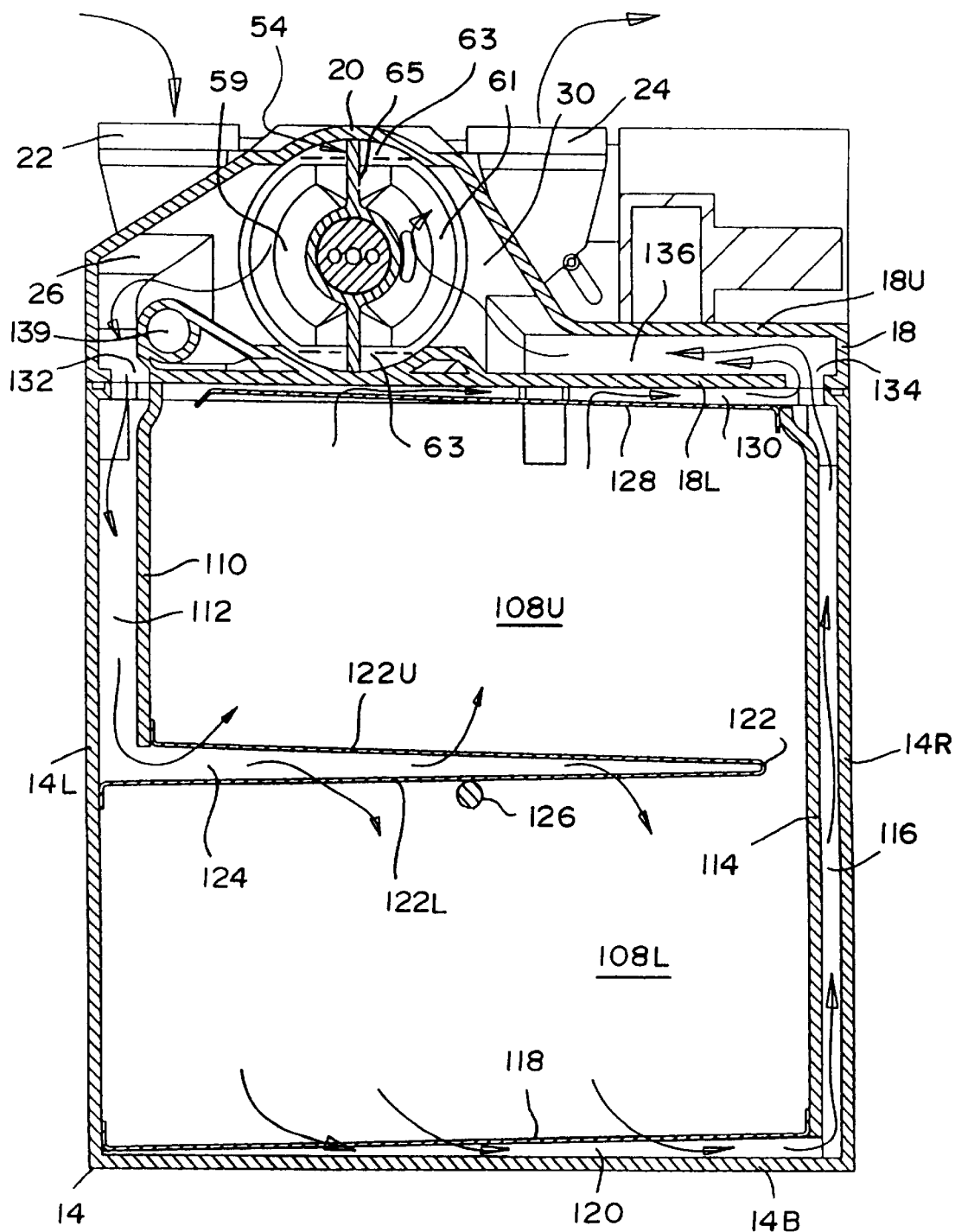
FIG. 4 is a vertical cross-sectional view of the new and improved spool valve-dual bed ventilation/respiratory regeneration system shown in FIG. 3 as taken along the lines 4—4 of FIG. 3.

With continued reference being made to FIG. 2, and with additional reference being made to FIG. 3, a spool valve 54 is adapted to be reciprocally disposed within the cylinder member 20 of the spool valve housing 18, and the spool valve 54 is seen to comprise three axially separated annular portions 56,58,60 which are integral with and respectively provided upon opposite ends of the spool valve 54 and at an axially central portion of the spool valve 54. The end sections 56,58 are substantially solid components, and it is seen that the end section 56 is provided with a pair of spring-energized piston seal members 62,64 which are made from PTFE, are commercially available from the BAL Seal Engineering Company, and are disposed upon external, axially spaced positions of section 56. End section 58 is similarly provided with a pair of piston seal members 66,68 which are also disposed upon external, axially spaced positions thereof, and it is noted that the pairs of seal members 62,64 and 66,68 are axially spaced from each other by means of a pair of split PTFE spacers 67 and 69. The central section 60 is essentially hollow and defines a pair of axially extending internal passageways 59 and 61 upon opposite lateral sides of spool valve 54, and in addition, a pair of external bypass flow passages 63, only one of which is visible in FIG. 2 but both passages 63 are visible in the background of FIG. 4, are defined upon diametrically opposite external portions of the central section 60. A partition 65 normally prevents any other bypass flow around spool valve 54.

The spool valve 54 is also seen to further comprise a pair of oppositely disposed blind bores 70,72, which are separated by means of a central divider wall or partition member 74, wherein the blind bores 70,72 in effect define cylinders within which the pistons 42,44 of the end caps 38, 40 are accommodated. It is therefore appreciated that contrary to conventional piston-cylinder arrangements, in accordance with the structural arrangement of the present invention, the pistons 42,44, which are attached to the end caps 38,40, are stationary while the cylinders 70,72, which are integral parts of the reciprocating spool valve 54, are movable. The axial external surfaces of the end sections 56, 58 of the spool valve 54 are provided with closure plates 73, 75 which have piston seal members 76,78 mounted upon radially inner circumferential portions thereof so as to, in effect, surroundingly seal the pistons 42,44 and fluidically isolate axially outer sections 77,79 of the cylinder member 20 from axially inner sections 81,83 of the cylinder member 20. The closure plates 73,75 are further provided with O-ring seal members 85,87 which are mounted upon radially outer circumferential portions thereof so as to provide fluidic seals with respect to the end sections 56,58. Suitable retainer discs or plates 80,82 are fastened to the external surface portions of the end sections 56,58 of the valve spool 54, by means of suitable fasteners, not shown, so as to retain the piston seal members 76,78 and the closure plates 73,75 thereon.

With continued reference being made to FIGS. 1–3, and in order to operate or actuate the spool valve system 10 in accordance with the teachings of the present invention, a pair of high-pressure, solenoid-actuated control valves 84,86 are mounted upon the spool valve housing 18, and the valves 84,86 are fluidically connected to an oxygen manifold 88 which is supplied with high-pressure oxygen at, for example, 100 psi ($6.89 \times 10^5$ Pascals, from a suitable source of oxygen, not shown, which may be an oxygen bottle or the like having oxygen contained therein at a pressure of 1000 psi ($6.89 \times 10^6$ Pascals). A suitable pressure regulator, also not shown, is operative in a well-known manner so as to convey the oxygen from the oxygen bottle to the oxygen manifold 88 at the desired pressure level. A second pressure regulator, also not shown, may also be incorporated within the system and downstream from the first pressure regulator so as to permit oxygen to be conveyed into the astronaut ventilation suit loop at a pressure of, for example, 4 psi ($2.76 \times 10^4$ Pascals).

A first oxygen conduit line 90 has a first end thereof operatively associated with the oxygen solenoid valve 84, and a second oxygen conduit line 92 has a first end thereof operatively associated with the oxygen solenoid valve 86. A second end of conduit line 90 is fluidically connected to end cap 38 of spool valve cylinder 20, and a second end of conduit line 92 is fluidically connected to end cap 40 of spool valve cylinder 20. End cap 38 has a fluid passageway 94 defined therein, and piston 42 is similarly provided with an axial passageway 96 wherein end cap passageway 94 fluidically interconnects conduit line 90 to passageway 96. In this manner, when solenoid valve 84 is actuated, oxygen can flow through conduit line 90, end cap passageway 94, and piston passageway 96 so as to flow into cylinder bore 70 of spool valve 54 and thereby move spool valve 54 away from piston 42. In a similar manner, end cap 40 has a fluid passageway 98 defined therein, and piston 44 has an axial passageway 100 defined therein such that the end cap passageway 98 fluidically interconnects conduit line 92 to passageway 100. In this manner, when solenoid valve 86 is actuated, oxygen can flow through conduit line 92, end cap passageway 98, and piston passageway 100 so as to flow into cylinder bore 72 of valve spool 54 and thereby move spool valve 54 away from piston 44.

In order to properly control the operative sequencing of the spool valve system, and in particular, the predeterminedly timed operation of the solenoid valves 84,86 so as to in turn control the reciprocating movements of the spool valve 54, the system 10 further comprises a microprocessor-driven electronic controller 102. In addition, an interior wall portion of each end cap 38,40 is provided with a valve position indicator switch 104,106 which respectively senses the end-of-travel movement of the spool valve 54 at the end of an operative cycle. The valve position indicator switches 104, 106 are operatively connected to the controller 102 such that when one of the switches 104,106 senses the end-of-travel movement of the spool valve 54, the particular one of the switches 104,106 generates a signal to the controller 102 whereby the latter will actuate or energize the appropriate oxygen solenoid valve 84,86 so as to stop the flow of oxygen into its associated conduit line 90,92 and thereby remove the actuating force upon the spool valve 54 since it has reached its end of travel movement.

Subsequently, after a predetermined period of time, such as, for example, six (6) minutes, the controller 102 will generate a signal to the appropriate oxygen solenoid valve 84,86 so as to discharge oxygen into its associated conduit line 90,92 and thereby commence movement of the spool valve 54 in the opposite direction in connection with a subsequent operative cycle. It is also to be noted that the controller 102 has a timing cycle programmed therein whereby, for example, it predeterminedly senses the length of time of the operative movement cycles of the spool valve 54 and the actuation of the valve position indicator switches 104,106 in connection with the cycling of the spool valve 54. In this manner, if the controller 102 fails to receive a suitable signal from the switches 104,106 within a predetermined time period, such is indicative of a failure somewhere within the system, and the controller 102 will generate a system failure signal.

With reference now being made to FIGS. 6–12, the operation of the spool valve control system of the present invention will now be described in connection with a complete operative cycle of the dual-bed ventilation air regeneration system. Commencing with FIG. 6, the spool valve 54 is illustrated as being in its first extreme position which is essentially opposite that position disclosed within FIG. 3 and wherein the spool valve position of FIG. 6 comprises the start position of the spool valve 54 at the commencement of a spool valve travel cycle. It is also noted that while FIGS. 6–12 are substantially the same as FIG. 3 in connection with the illustration of the various component parts of the system of the present invention, all component parts of the system have not been numbered in FIGS. 6–12 simply for clarity purposes, but to the contrary, only those components which are relevant to the particular discussion of the particular figure being described have been numbered.

Figure 6:
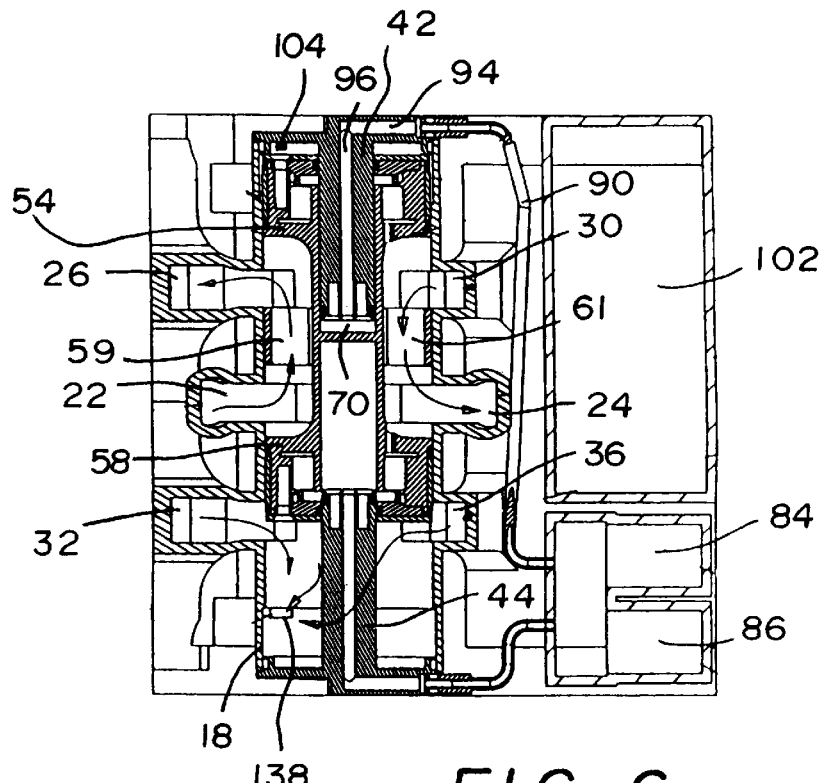
FIG. 6 is a cross-sectional view similar to that of FIG. 3 and showing the spool valve disposed at one of its extreme positions at which the first chemical bed, Bed I, is fluidically connected to the ventilation loop while the second chemical bed, Bed II, is fluidically exposed to the vacuum of space.

As can therefore be appreciated from FIG. 6, the spool valve 54 is disposed in its uppermost extreme position, as viewed in the figure, and accordingly, ventilation or respiration air enters the ventilation air inlet manifold 22 from the astronaut space suit and is permitted to pass into and through the axial passageway 59 of the spool valve 54 so as to in turn be conducted into the inlet manifold 26 of chemical bed 11. For the purposes of this discussion, the air flow through chemical bed 11 can be appreciated as a result of reference also being made to FIG. 4 even though FIG. 4 is technically a cross-section through chemical bed 12 because the air flow paths through the two different chemical beds 11,12 are precisely the same depending upon the particular phase of the overall air regeneration cycle.

Each chemical bed 11,12 is seen to comprise an upper bed portion 108U and a lower bed portion 108L, and each bed portion 108U,108L comprises a mixture of plastic beads, not shown, which are coated with a suitably adsorbent amine material, and wherein further, the beds 108U,108L are also partially filled with an expanded aluminum foam which assists in heat transfer properties from the chemical bed that is adsorbing, which is an exothermic reaction, and to the bed that is desorbing, which is an endothermic reaction so as to improve the efficiency of the regeneration system as well as to reduce the amount of bed material required to meet performance requirements. The use of amine-coated beads, along with the expanded aluminum foam, is well-known in the art, does not form or comprise a novel aspect of the present invention, and accordingly, will not be described further in detail. The canister 14 comprises a left side wall 14L, a bottom wall 14B, and a right side wall 14R, and the spool valve housing 18 comprises a platform section which includes an upper wall portion 18U and a lower wall portion 18L, wherein as has been previously noted, the spool valve housing 18 is disposed atop the canister 14 so as to close and seal the same.

A first partition wall 110 depends downwardly from a left side portion of spool valve housing lower wall portion 18L so as to be spaced from the left canister side wall 14L and thereby define therewith a first vertical flow channel 112, while a second partition wall 114 is spaced from the right canister side wall 14R so as to similarly define therewith a second vertical flow channel 116. A first lower screen member 118 is secured to a bottom portion of left canister side wall 14L and to a bottom portion of second partition wall 114 so as to be spaced above canister bottom wall 14B whereby a first horizontal flow channel 120 is defined therebetween. A second intermediate screen member 122 is folded in half upon itself so as to define an upper screen section 122U and a lower screen section 122L which are spaced from each other so as to define therebetween a second horizontal flow channel 124. The non-connected ends of the screen member 122 are respectively secured to the left canister side wall 14L and the lower end of the dependent partition wall 110. A tie rod 126 is disposed beneath the lower screen section 122L and extends from the central partition wall 16 to each one of the oppositely disposed external side walls 125,127 of the canister 14 so as to provide stiffening support for the canister side walls 125,127. A third upper screen member 128 is secured to an upper end portion of partition wall 114 and is spaced beneath the lower wall portion 18L of the spool valve housing 18 so as to define a third horizontal flow 130 channel therebetween. It is thus appreciated that the lower chemical bed portion 108L is defined by the left canister side wall 14L, lower screen member 118, the partition wall 114, and the lower screen section 122L, while the upper chemical bed portion 108U is defined by partition wall 110, the upper screen section 112U, the partition wall 114, and the upper screen member 128. The amine-coated bead members and expanded aluminum foam materials are of course supported upon the lower screen member 118 and the upper screen section 122U within the respective chemical bed portions 108L and 108U.

With reference therefore now being made to both FIGS. 4 and 6, it is seen that when the ventilation or respiration air flows into the inlet manifold 26 for chemical bed 11, the air is conducted downwardly into vertical flow channel 112 after passing through an aperture 132 defined within the left side of lower spool valve housing wall portion 18L. The air flow is then conducted through horizontal flow channel 124 whereupon the air flow flows upwardly through upper screen section 122U and into upper chemical bed portion 108U, as well as downwardly through lower screen section 122L and into lower chemical bed portion 108L, whereby the air flows chemically interact with the bed materials such that the carbon dioxide and water vapor components thereof are adsorbed therefrom.

After passing through the upper chemical bed portion 108U, the upper air flow, from which the carbon dioxide and water vapor components have been removed, is discharged through upper screen member 128, into horizontal flow channel 130, through an aperture 134 defined within the right side of lower spool valve housing wall portion 18L, and into a fourth horizontal flow channel 136 which is defined between the lower spool valve housing wall portion 18L and the upper spool valve housing wall portion 18U. From fourth horizontal flow channel 136, the air flow passes into the outlet manifold 30, through axial passageway 61 of the spool valve 54, and enters ventilation air outlet manifold 24 for conveyance back into the ventilation loop of the astronaut space suit. In a similar manner, after passing through the lower chemical bed portion 108L, the lower air flow, from which the carbon dioxide and water vapor components have also been removed, is discharged through lower screen member 118 and into horizontal flow channel 120. From flow channel 120, the air flow enters vertical flow channel 116 and is conducted through aperture 134 and into horizontal flow channel 136 so as to likewise pass into the outlet manifold 30, through axial passageway 61 of the spool valve 54, and into ventilation air outlet manifold 24 for conveyance back into the ventilation loop of the astronaut space suit.

Figure 5:
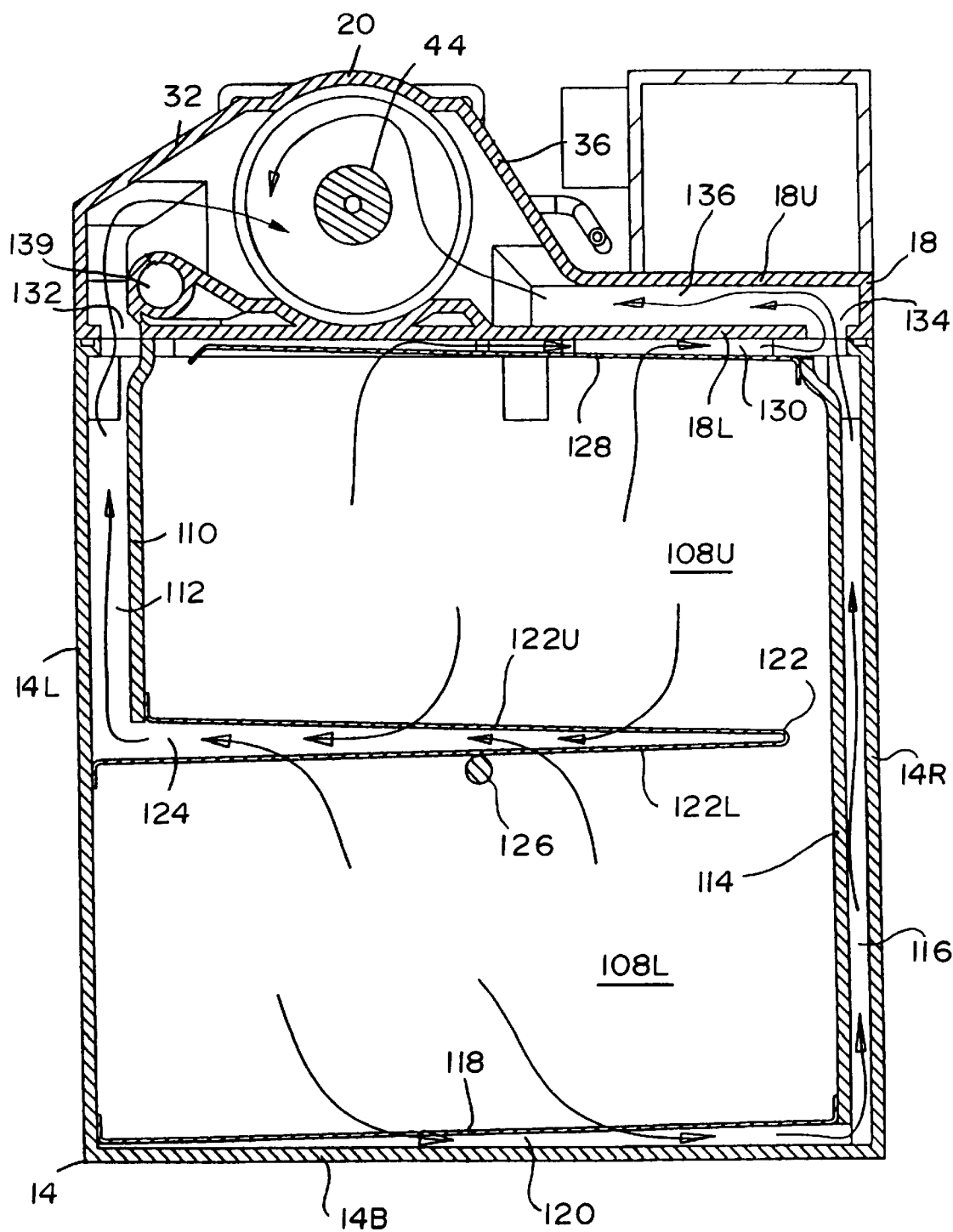
FIG. 5 is a vertical cross-sectional view of the new and improved spool valve-dual bed ventilation/respiratory regeneration system shown in FIG. 3 as taken along the lines 5—5 of FIG. 3.

With reference now being additionally made to FIG. 5 in conjunction with FIG. 6, the air flow through chemical bed 12 can be appreciated even through FIG. 5 is technically a cross-section through chemical bed 11 because, again, the air flow paths through the two different chemical beds 11,12 are precisely the same depending upon the particular phase or point of the overall air regeneration cycle. Each end of the spool valve housing 18 is provided with a vacuum port, and the vacuum port for chemical bed 12 is disclosed in FIG. 6 at 138. As a result of the disposition of the spool valve 54 in its upper extreme position as illustrated in FIG. 6, it is seen that section 58 of spool valve 54 blocks fluidic communication between the inlet manifold 32 of bed 12 and the ventilation air inlet manifold 22, however, fluidic communication is permitted between both the inlet and outlet manifolds 32,36 of chemical bed 12 and the vacuum port 138. In this manner, the chemical bed 12 is exposed to the vacuum port 138 which, in turn, is connected to a vacuum manifold 139 and the hard vacuum of space, and thus, chemical bed 12 undergoes desorption whereby the carbon dioxide and water vapor deposits, which were previously deposited and adsorbed thereon during a previous adsorption phase of the entire bed regeneration cycle, are now discharged into space.

With specific reference being made to FIG. 5, the vacuum manifold 139 is illustrated within the left portion of the valve spool housing 18, and it is appreciated that the air flows from the upper and lower chemical bed portions 108U and 108L are discharged toward the vacuum manifold 139. More particularly, and contrary to the air flows through the chemical beds during an adsorbing phase of the cycle, when the air flows are being evacuated from the chemical beds during the desorbing phase of the cycle, the air flows are evacuated or exhausted from both the upper and lower ends of each of the upper and lower chemical bed portions 108U,108L.

In connection with the evacuation of the air from, for example, the upper chemical bed portion 108U, air from the lower end region of the upper chemical bed portion 108U is evacuated or withdrawn through the upper screen section 122U of the intermediate screen member 122, into horizontal flow channel 124, upwardly through vertical flow channel 112, and through aperture 132 so as to enter inlet manifold 32 from which it is exhausted through vacuum manifold 139. In a similar manner, the air within the upper end region of the upper chemical bed portion 108U is evacuated or withdrawn through upper screen member 128, into horizontal flow channel 130, through aperture 134, through horizontal flow channel 136, through outlet manifold 36, and around piston 44 of end cap 40 so as to be exhausted through vacuum port 138.

In connection with the evacuation of the air from the lower chemical bed portion 108L, the air within the upper end region of the lower chemical bed portion 108L is evacuated or withdrawn through the lower screen section 122L of the intermediate screen member 122, into horizontal flow channel 124, upwardly through vertical flow channel 112, and through aperture 132 so as to enter inlet manifold 32 from which it is exhausted through vacuum manifold 139. In a similar manner, the air within the lower end region of the lower chemical bed portion 108L is evacuated or withdrawn through lower screen member 118, upwardly through the vertical flow channel 116, through aperture 134, through horizontal flow channel 136, into outlet manifold 36, and around piston 44 so as to be discharged through vacuum manifold 139.

Figure 7:
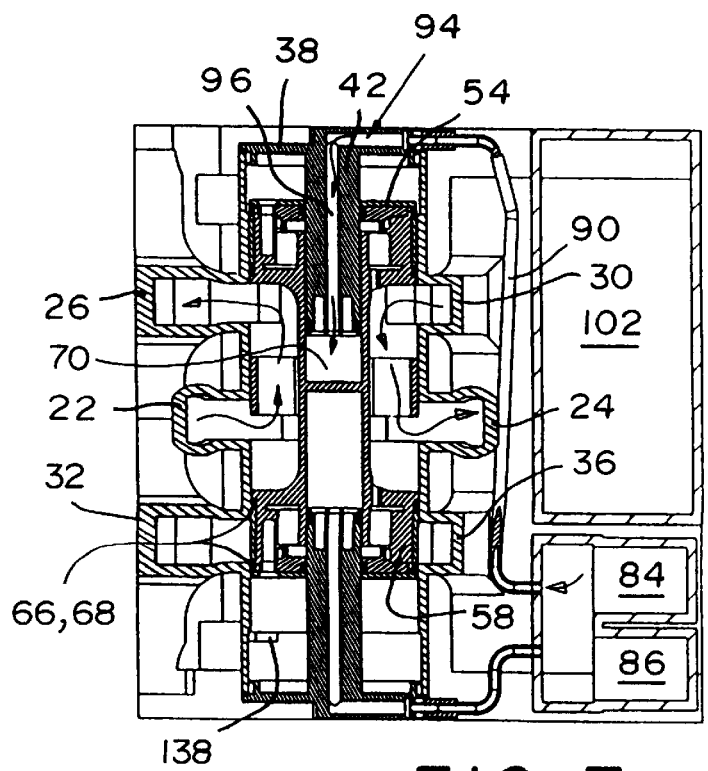
FIG. 7 is a cross-sectional view similar to that of FIG. 6, wherein the spool valve has moved from its position of FIG. 6, toward its other opposite extreme position, and at which Bed I is still in fluidic communication with the ventilation loop, however, Bed II is now isolated so as not to be in fluidic communication with either the ventilation loop or vacuum.

Continuing now with the operative adsorption-desorption ventilation air-dual bed regeneration cycle, with reference being made to FIGS. 6 and 7, when the spool valve 54 attains the extreme position disclosed within FIG. 6, valve position indicator switch 104 generates a signal to the controller 102 whereby the latter, in turn, generates a signal which first deactivates solenoid vavle 86 so as to stop oxygen flow to cylinder bore 72 and starts a cycle timer for, for example, six (6) minutes whereupon, after the adsorb-desorb cycle has been completed, the controller 102 generates a signal energizes or actuates the oxygen solenoid valve 84. As a result, solenoid valve 84 is opened and oxygen, at a pressure level of 100 psi, is permitted to flow through conduit line 90, end cap passageway 94, and piston passageway 96. The oxygen then flows into cylinder bore 70 and begins to drive the spool valve 54 downwardly from the position shown in FIG. 6 to that shown in FIG. 7.

As can be appreciated from FIG. 7, as a result of the disposition of the spool valve 54 at the position shown in FIG. 7, the ventilation air inlet manifold 22 is still fluidically connected to the inlet manifold 26 of chemical bed 11, and the outlet manifold 30 of chemical bed 11 is still fluidically connected to the ventilation air outlet manifold 24 whereby ventilation air is still being recirculated through the astronaut suit loop and chemical bed 11 whereby chemical bed 11 is still disposed in its adsorption mode. End section 58 of spool valve 54, having its piston seal members 66,68 disposed thereon, has now moved downwardly, however, so as to effectively fluidically disconnect the inlet and outlet manifolds 32,36 of chemical bed 12 from the vacuum port 138 whereby the desorption phase of operation for chemical bed 12 is terminated, and chemical bed 12 is effectively sealed off at 0 psi pressure.

Figure 8:
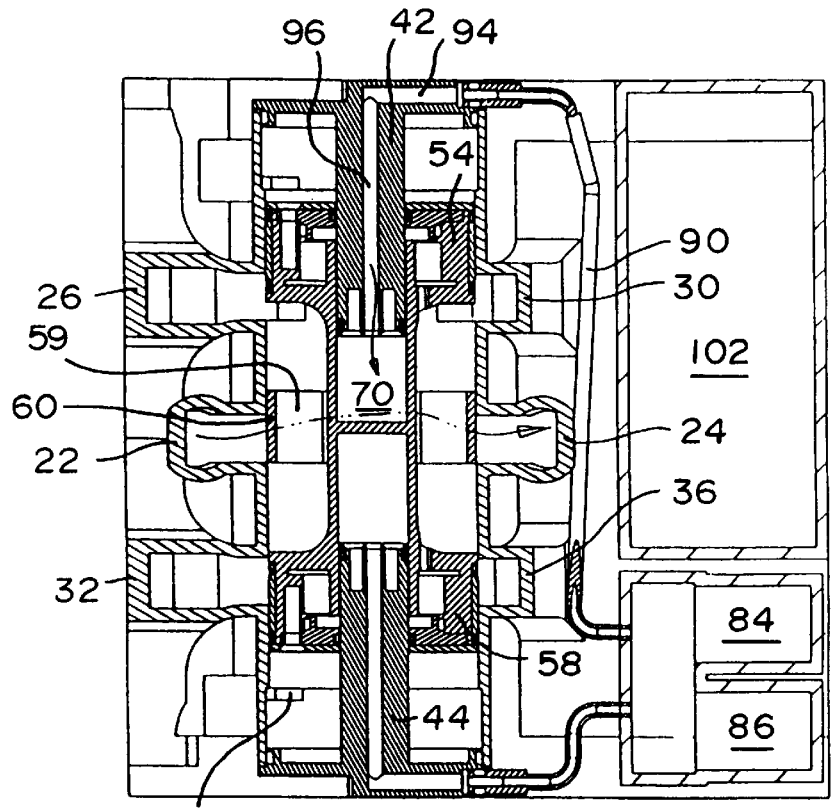
FIG. 8 is a cross-sectional view similar to that of FIG. 7 wherein the spool valve is disposed at a position which is closer to its opposite extreme position and at which Bed II is still isolated from both the ventilation loop and vacuum, however, Bed I is now also isolated from both the ventilation loop and vacuum, and the ventilation loop is disposed in a bypass mode.

With reference now being made to FIG. 8, oxygen continues to flow through conduit line 90, and passageways 94 and 96 into cylinder bore 70 so as to bias spool valve 54 further in the downwardly direction toward the piston 44, and as a result of such movement of spool valve 54, the central section 60 of spool valve 54 now seals off the fluidic communication between ventilation air inlet manifold 22 and the axial passageway 59 of the spool valve section 60. Therefore, at this point in the operative cycle, chemical bed 11 is fluidically isolated from the ventilation air or astronaut space suit loop. However, an air flow bypass or short circuit has effectively been established between the ventilation air inlet manifold 22 and the ventilation air outlet manifold 24 through means of the upper and lower external bypass flow passages 63,63 which are defined upon the upper and lower external portions of central section 60 of the spool valve 54 as shown in FIGS. 2 and 4. In this manner, the ventilation air circulation fan, not shown, operatively associated with the ventilation air circulation loop within the astronaut space suit is not adversely affected or deadheaded. Chemical bed 11 remains at ventilation air loop pressure, while chemical bed 12 remains at a pressure level of 0 psi.

Figure 9:
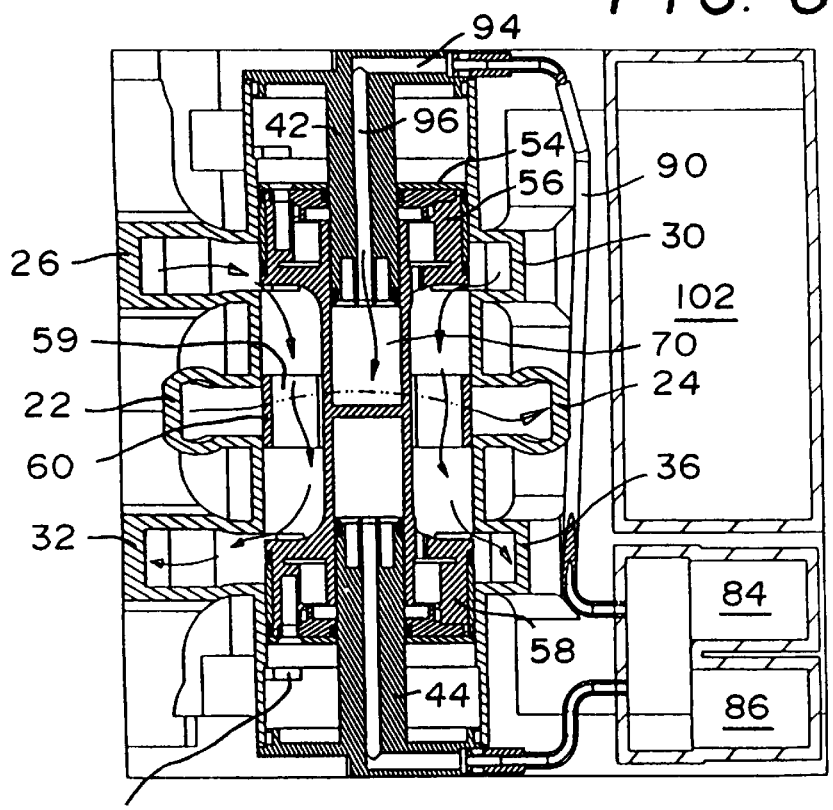
FIG. 9 is a cross-sectional view similar to that of FIG. 8 wherein the spool valve is disposed at a position which is closer to its opposite extreme position and at which both Bed I and Bed II are isolated from both the ventilation loop and vacuum, and the ventilation loop is still disposed in its bypass mode, however, Beds I and II are in fluidic communication with each other so as to achieve pressure equalization.

FIG. 9 discloses the portion of the operative cycle at which pressure equalization between the two chemical beds 11,12 occurs so as to achieve the ullage or air volume save process of the cycle. More particularly, oxygen at 100 psi pressure is still flowing through conduit line 90, into passageways 94 and 96, and into cylinder bore 70 so as to bias the spool valve 54 further toward piston 44. As a result of such disposition of the spool valve 54, the central section 60 of the spool valve 54 still effectively blocks or seals off the ventilation air inlet and outlet manifolds 22, 24 from chemical beds 11,12 whereby the ventilation air is still recirculated through the ventilation air loop of the astronaut space suit by means of the bypass flow passages 63, 63. However, end section 56 of spool valve 54 does not entirely block or seal off the inlet and outlet manifolds 26,30 of chemical bed 11, and similarly, end section 58 of the spool valve 54 now partially opens fluidic access to the inlet and outlet manifolds 32,36 of chemical bed 12. As a result of such disposition of spool valve 54, air from chemical bed 11 flows into chemical bed 12 as a result of the pressure differential defined between the two chemical beds whereby the pressures and air volumes within the two chemical beds 11,12 are now equalized.

Figure 10:
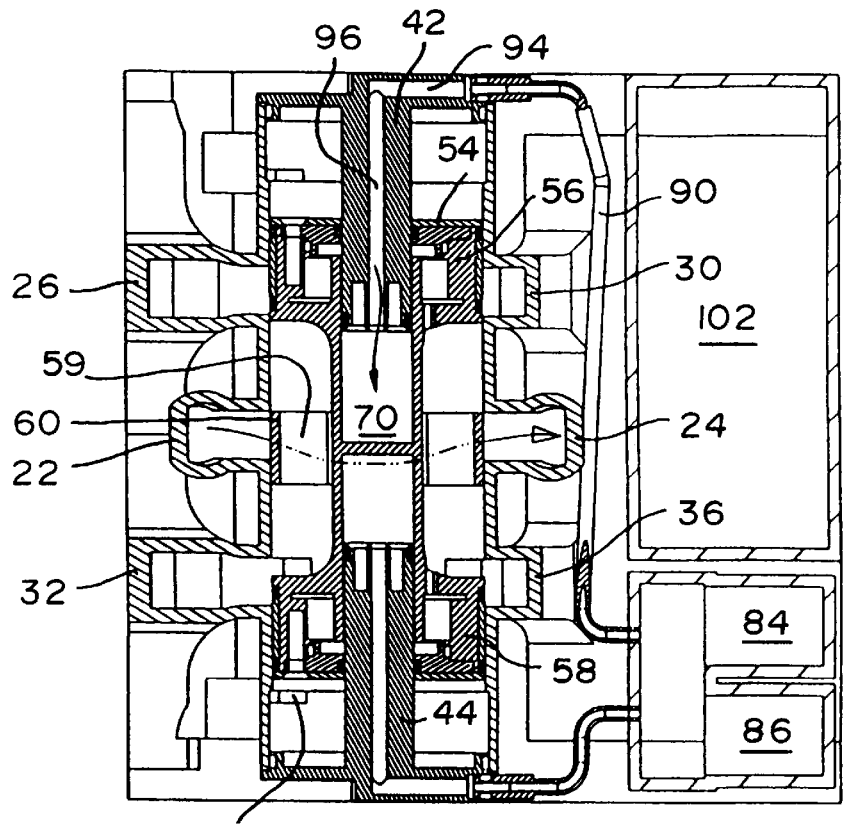
FIG. 10 is a cross-sectional view similar to that of FIG. 9 wherein the spool valve is disposed at a position which is closer to its opposite extreme position and at which both Bed I and Bed II are still isolated from both the ventilation loop and vacuum, and the ventilation loop is still dis posed in its bypass mode, however, Bed II is about to have its fluidic communication re-established with the ventilation loop so as to be repressurized.

With reference now being made to FIG. 10, 100 psi oxygen is still flowing through conduit line 90 and passageways 94 and 96 as a result of the activation of solenoid valve 84, and consequently, spool valve 54 continues to be biased downwardly toward piston 44. Section 56 of spool valve 54 has now moved axially downwardly so as to effectively seal or block off the inlet and outlet manifolds 26,30 of chemical 11 whereby fluidic communication, pressure equalization, and the ullage or volume save process between the chemical beds 11,12 is now terminated with the pressure within both chemical beds 11,12 being at approximately 2 psi which is one-half the ventilation air loop pressure of 4 psi. Ventilation air within the ventilation air loop of the astronaut space suit continues to be bypassed or short-circuited from ventilation air inlet manifold 22 to ventilation air outlet manifold 24 through means of the bypass passageways 63,63 of the central section 60 of the spool valve 54, and chemical bed 12 is about to be repressurized with ventilation air from the ventilation air loop of the astronaut space suit whereby chemical bed 12 will be disposed in its adsorb mode.

Figure 11:
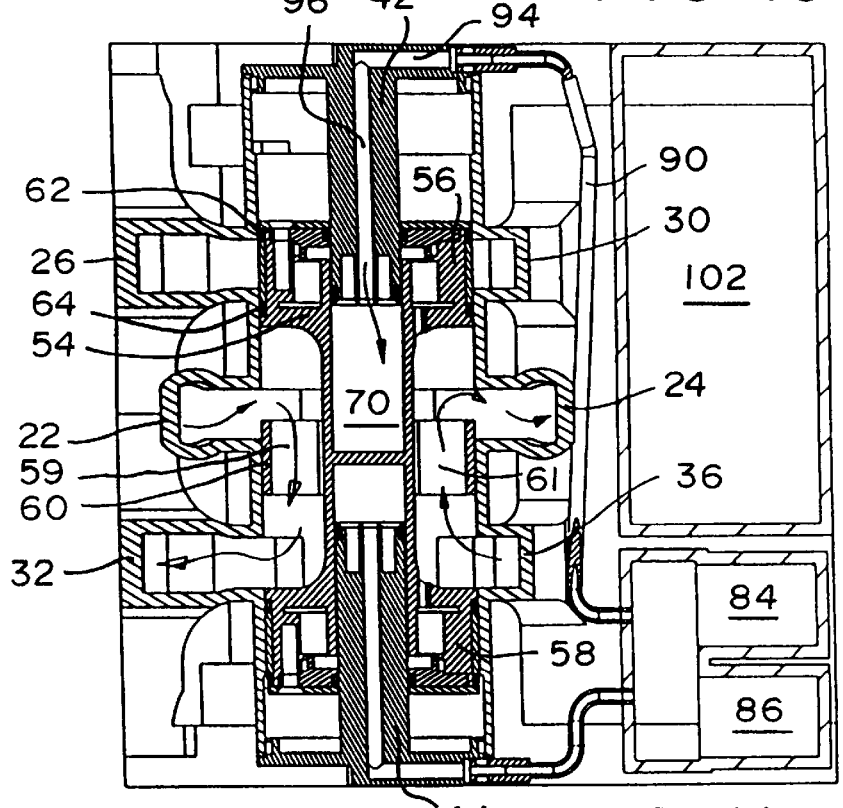
FIG. 11 is a cross-sectional view similar to that of FIG. 10 wherein the spool valve is disposed at a position which is closer to its opposite extreme position and at which Bed I is isolated from both the ventilation loop and vacuum, however, Bed II is now in fluidic communication with the ventilation loop.

Turning then to FIG. 11, oxygen continues to be supplied through conduit line 90 and passages 94,96 into cylinder bore 70 whereby the spool valve 54 is biased downwardly further toward piston 44. As a result of such disposition of spool valve 54, spool valve section 60, having piston seal members 62,64 disposed thereon, seal off the inlet and outlet manifolds 26,30 of chemical bed 11 whereby chemical bed 11 is isolated with an internal pressure of approximately one-half that of the ventilation air loop pressure or 2 psi. At the same time, central section 60 of spool valve 54 has moved with respect to the ventilation air inlet and outlet manifolds 22,24 so as to now permit fluidic communication between the ventilation air loop of the astronaut space suit and the inlet and outlet manifolds 32,36 of the chemical bed 12 whereby pressure is increased to full air loop pressure of 4 psi and chemical bed 12 is now operative in its adsorb mode so as to adsorb carbon dioxide and water vapor deposits from the ventilation air loop of the astronaut space suit in accordance with an air flow pattern similar to that illustrated in FIG. 4.

Figure 12:
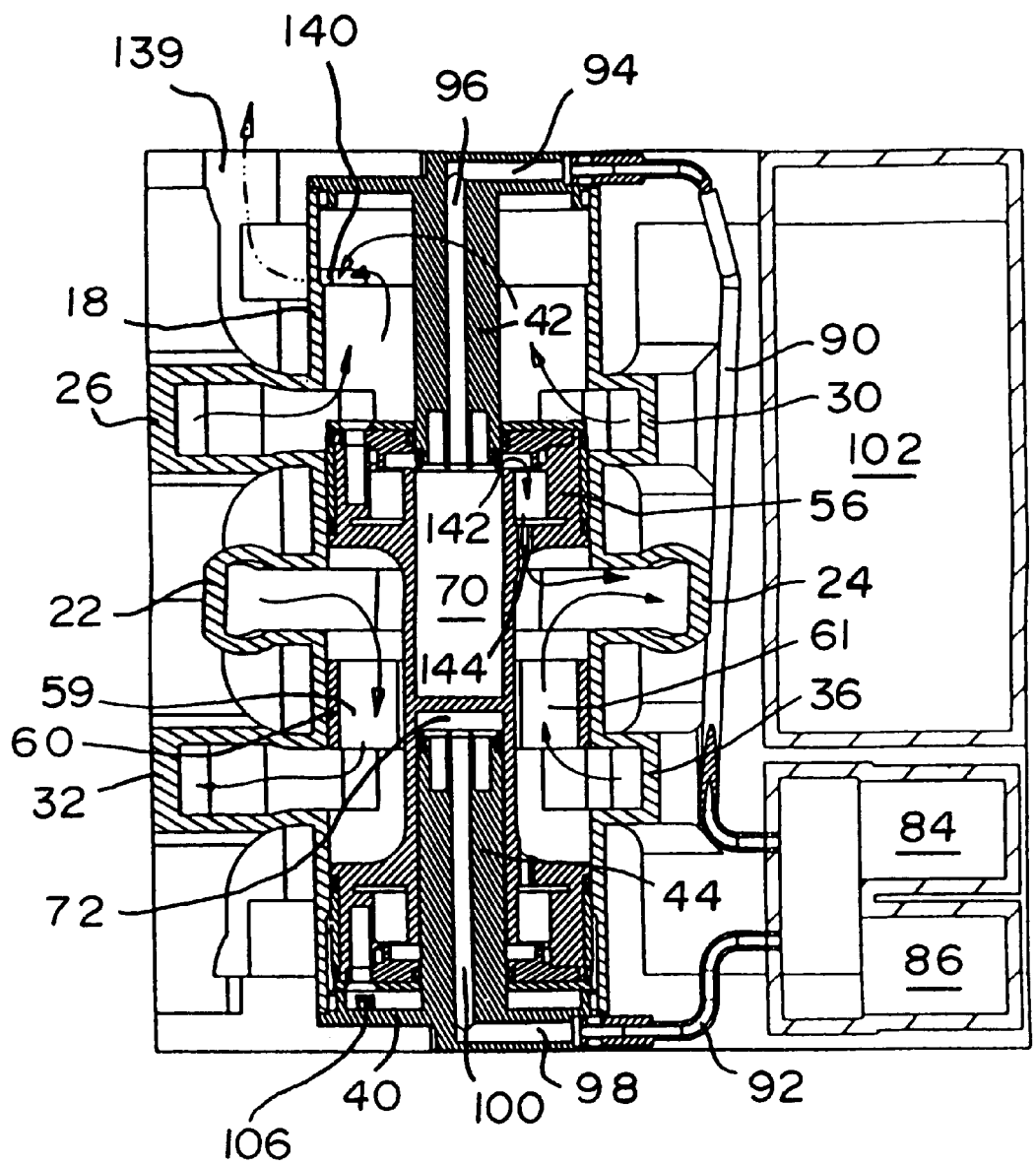
FIG. 12 is a cross-sectional view similar to that of FIG. 11 wherein the spool valve is now disposed at its opposite extreme position at which Bed II is now disposed in full fluidic communication with the ventilation loop, Bed I is now exposed to vacuum, and the oxygen air flow, used to actuate the spool valve and move the same from its first extreme position to its second opposite extreme position, is now in fluidic communication with the vent loop so as to replenish the oxygen supply that was lost during the previous desorb portion of the cycle when the respective one of the chemical beds was exposed to vacuum.

With reference lastly being made to FIG. 12, the spool valve 54 has attained its second extreme or end-of-stroke position, and as a result of such disposition of the spool valve 54, the valve position indicator switch 106 has been actuated whereby the same has generated a signal to the controller 102 which has, in turn, de-energized the oxygen solenoid valve 84. Accordingly, no further oxygen is supplied to conduit line 90. At this position of the spool valve 54, it is seen that the ventilation air inlet and outlet manifolds 22,24 are in fluidic communication with the inlet and outlet manifolds 32,36 of chemical bed 12, through means of axial passageways 59,61 of central spool valve section 60, and accordingly, chemical bed 12 is fluidically connected to the ventilation air loop of the astronaut space suit and is operating in its adsorb mode so as to remove carbon dioxide and water vapor deposits from the ventilation air conveyed through the space suit ventilation loop. In a similar manner, the inlet and outlet manifolds 26,30 of chemical bed 11 are fluidically connected to a vacuum port 140 formed within the spool valve housing 18 at a position opposite that of vacuum port 138 operatively associated with chemical bed 12, and vacuum port 140 is fluidically connected to vacuum manifold 139 such that chemical bed 12 is exposed to the hard vacuum of space whereby the accumulated carbon dioxide and water vapor deposits thereof are desorbed therefrom.

It is to be noted that when the spool valve 54 has attained the position shown in FIG. 12, and regardless of the fact that no additional oxygen is being conducted into the cylinder bore 70, the valve 54 has been moved to such a degree relative to the end of piston 42 that the split ring seal member 46 of piston 42 becomes sealingly disengaged with respect to the open end of the spool valve 54 which defines cylinder bore 70 whereby a bypass flow passage 142 is defined between the sealed end of the piston 42 and the open end of the spool valve 54 which defines cylinder bore 70. An additional flow passage 144 is defined within section 56 of the spool valve 54 so as to conduct such bypass oxygen flow from the interior of cylinder bore 70 into ventilation air outlet manifold 24. In this manner, the high pressure oxygen, that was used to drive the spool valve 54, expands into the ventilation air loop whereby the ventilation loop is repressurized with oxygen at the appropriate pressure and volume, as controlled by the aforenoted space suit pressure regulator, not shown, so as to compensate for the air that was previously vented to space at the commencement of the desorb cycle. This use of the actuation oxygen within the ventilation air loop of the space suit substantially reduces the amount of make-up oxygen that would otherwise be required.

The aforenoted description completes the operative regeneration cycle of the dual-bed, spool valve system of the present invention, and it is to be appreciated that a new operative cycle is then commenced within a predetermined period of time by means of a suitable signal generated from the controller 102 to the oxygen solenoid valve 86. In this manner, valve 86 is opened so as to permit actuating oxygen to flow into conduit line 92 and through passages 98,100 of end cap 40 and piston 44, respectively, and thereby enter cylinder bore 72 so as to thereby bias spool valve 54 in the upward direction toward piston 42.

Thus, it may be seen that in accordance with the teachings of the present invention, a new and improved dual-bed, single spool valve air regeneration system has been developed whereby the single spool valve can control all fluid port and manifold connections between the two chemical beds, the ventilation air loop of the space suit, and the hard vacuum of space. In addition, pressure equalization and an ullage save process is incorporated within the operative sequence of the system whereby only half the chemical bed air volume is lost to space during the desorb mode as opposed to a full chemical bed air volume that would otherwise be lost. Still further, in order to conserve the oxygen supply, the oxygen that is used to actuate the spool valve is used to repressurize the ventilation air loop at the end of a valve spool stroke cycle so as to compensate for the lost volume of air dumped into space during the previous desorb mode of the chemical beds.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A dual-bed ventilation air regeneration system, comprising:

a ventilation air loop having inlet and outlet manifolds fluidically connected to said ventilation air loop so as to conduct ventilation air in from and out to said ventilation air loop;

a first chemical bed having inlet and outlet manifolds fluidically connected thereto;

a second chemical bed having inlet and outlet manifolds fluidically connected thereto;

a spool valve housing having a pair of exhaust ports defined within opposite ends thereof; and a single spool valve reciprocally disposed within said spool valve housing for disposition at two extreme positions within said spool valve housing wherein when said single spool valve is disposed at a first one of said two extreme positions within said spool valve housing, said inlet and outlet manifolds of said ventilation air loop are in fluidic communication with said inlet and outlet manifolds of a first one of said first and second chemical beds whereby ventilation air from said ventilation air loop is conveyed into and out from said first one of said first and second chemical beds, while said inlet and outlet manifolds of a second one of said first and second chemical beds is in fluidic communication with a first one of said exhaust ports of said spool valve housing such that the volume of air within said second one of said first and second chemical beds is exhausted, whereas when said single spool valve is disposed at a second one of said two extreme positions within said spool valve housing, said inlet and outlet manifolds of said ventilation air loop are in fluidic communication with said inlet and outlet manifolds of said second one of said first and second chemical beds whereby ventilation air from said ventilation air loop is conveyed into and out from said second one of said first and second chemical beds, while said inlet and outlet manifolds of said first one of said first and second chemical beds is in fluidic communication with a second one of said exhaust ports of said spool valve housing such that the volume of air within said first one of said first and second chemical beds is exhausted.

2. A dual-bed ventilation air regeneration system as set forth in claim 1, wherein:

said single spool valve comprises a pair of oppositely disposed cylinders;

said spool valve housing comprises a pair of oppositely disposed pistons respectively disposed within said oppositely disposed cylinders of said single spool valve; and means mounted upon said spool valve housing for causing movement of said pair of oppositely disposed spool valve cylinders relative to said pair of pistons of said spool valve housing.

3. A dual-bed ventilation air regeneration system as set forth in claim 2, wherein:

said pair of oppositely disposed spool valve cylinders comprise cylinder bores;

said pair of oppositely disposed spool valve housing pistons have axial passageways defined therein; and said means for causing movement of said pair of oppositely disposed spool valve cylinders relative to said pair of oppositely disposed spool valve housing pistons comprises a source of actuating air fluidically connected to said axial passageways of said pair of oppositely disposed pistons for biasing said single spool valve away from a particular one of said pair of spool valve housing pistons from which said air is discharged through a particular one of said axial passageways of said particular one of said pair of spool valve housing pistons and into a respective one of said cylinder bores.

4. A dual-bed ventilation air regeneration system as set forth in claim 3, wherein:

said means for causing said movement of said pair of oppositely disposed spool valve cylinders comprises means for alternatively routing said actuating air to said axial passageways of said oppositely disposed pistons so as to cause said spool valve to achieve its reciprocating movement within said spool valve housing.

5. A dual-bed ventilation air regeneration system as set forth in claim 4, wherein said means for alternatively routing said actuating air comprises:

a pair of solenoid-actuated valves fluidically connected to said source of actuating air;

a pair of fluid conduits fluidically respectively connecting said pair of solenoid-actuated valves to said pair of axial passageways defined within said spool valve housing pistons;

switch means disposed within said spool valve housing for detecting the presence of said spool valve adjacent either one of said two extreme positions and for generating a spool valve position signal; and control means for receiving said spool valve position signal from said switch means and for generating a signal for deactuating a first one of said pair of solenoid-actuated valves and for actuating a second one of said pair of solenoid-actuated valves.

6. A dual-bed ventilation air regeneration system as set forth in claim 1, wherein said spool valve comprises:

axially spaced end sections having seal means disposed thereon for fluidically isolating one of said first and second chemical beds from the other one of said first and second chemical beds and said ventilation air loop when said one of said first and second chemical beds is fluidically connected to one of said exhaust ports while said other one of said first and second chemical beds is fluidically connected to said ventilation air loop as a result of said spool valve being disposed at one of said two extreme positions; and a central section having axially extending passage means defined therein for fluidically connecting said inlet and outlet manifolds of said ventilation air loop and said inlet and outlet manifolds of said other one of said first and second chemical beds when said spool valve is disposed at one of said two extreme positions.

7. A dual-bed ventilation air regeneration system as set forth in claim 6, wherein said central section of said spool valve comprises:

first external surface means for blocking said inlet and outlet manifolds of said ventilation air loop so as to fluidically isolate said ventilation air loop from both of said first and second chemical beds, and second external surface means for permitting bypass fluidic communication of said ventilation air around said spool valve from said inlet manifold of said ventilation air loop to said outlet manifold of said ventilation air loop, when said spool valve is disposed at a position intermediate said two extreme positions; and said axially extending passage means fluidically interconnects said first and second chemical beds with each other, when said spool valve is disposed at said position intermediate said two extreme positions, so as to achieve pressure equalization within said first and second chemical beds after said one of said first and second chemical beds has been fluidically connected to said one of said exhaust ports.

8. A dual-bed ventilation air regeneration system as set forth in claim 7, wherein:

said axially extending passage means of said central section comprises a pair of axially extending passages disposed upon opposite sides of said spool valve.

9. A dual-bed ventilation air regeneration system as set forth in claim 7, further comprising:

partition means interposed between said central section of said spool valve and said axially spaced end sections of said spool valve for preventing bypass flow of said ventilation air around said spool valve other than through said second external surface means of said central section of said spool valve.

10. A dual-bed ventilation air regeneration system as set forth in claim 3, further comprising:

fluid passage means defined within each end of said single spool valve for fluidically connecting each one of said cylinders with said outlet manifold of said ventilation air loop when said single spool valve is disposed at one of said two extreme positions such that a portion of said actuating air is fluidically conducted into said ventilation air loop so as to replenish said ventilation air loop with air that was previously exhausted from one of said first and second chemical beds when a particular one of said first and second chemical beds was fluidically connected to one of said pair of exhaust ports of said spool valve housing.

11. A dual-bed ventilation air regeneration system as set forth in claim 1, wherein:

said inlet and outlet manifolds of said ventilation air loop are disposed at axial positions which are interposed between said inlet and outlet manifolds of said first and second chemical beds.

12. A dual-bed ventilation air regeneration system as set forth in claim 1, wherein:

said ventilation air loop comprises a respiration air loop defined within an astronaut space suit;

said pair of exhaust ports defined within said spool valve housing are adapted to be fluidically connected to the hard vacuum of space; and said first and second chemical beds comprise chemical means disposed therein for adsorbing carbon dioxide and water vapor deposits from said astronaut respiration air loop when said chemical beds are respectively in fluidic communication with said respiration air loop, and for desorbing said adsorbed deposits of carbon dioxide and water vapor to said hard vacuum of space when said chemical beds are respectively in fluidic communication with said exhaust ports of said spool valve housing.

13. A dual-bed ventilation air regeneration system as set forth in claim 12, further comprising:

a canister within which said first and second chemical beds are disposed, wherein the top of said canister is open; and said spool valve housing comprises a cover disposed atop said canister for closing said open top of said canister.

14. A dual-bed ventilation air regeneration system as set forth in claim 13, wherein:

said canister and said spool valve housing cover comprise an astronaut back-pack unit.

15. A dual-bed ventilation air regeneration system as set forth in claim 14, wherein:

each one of said first and second chemical beds comprises multiple bed portions defined by a plurality of screen members and partition walls.

16. A dual-bed ventilation air regeneration system as set forth in claim 14, wherein:

each one of said first and second chemical beds comprises an upper bed portion and a lower bed portion defined by a plurality of screen members and partition walls.

17. A dual-bed ventilation air regeneration system as set forth in claim 16, wherein:

said upper bed portion is defined by a first partition wall spaced inwardly from a first side wall of said canister, and a second partition wall spaced inwardly from a second side wall of said canister, a first upper screen member spaced beneath said spool valve housing cover, and a second lower screen member; and said lower bed portion is defined by said first side wall of said canister, said second partition wall, a first lower screen member spaced above a bottom wall portion of said canister, and a second upper screen member.

18. A dual-bed ventilation air regeneration system as set forth in claim 17, wherein:

said second lower screen member of said upper bed portion and said second upper screen member of said lower bed portion comprise an integral screen component disposed at an elevational level which is intermediate of said chemical bed so as to divide said chemical bed into said upper and lower bed portions.

19. A dual-bed ventilation air regeneration system as set forth in claim 18, wherein:

said first partition wall spaced from said first side wall of said canister defines a first air flow channel therebetween, said second partition wall spaced from said second side wall of said canister defines a second air flow channel therebetween, said first upper screen member spaced from said spool valve housing cover defines a third air flow channel therebetween, said first lower screen member spaced from said bottom wall portion of said canister defines a fourth air flow channel therebetween, and said upper and lower screen members comprising said integral intermediate screen component are spaced from each other so as to define a fifth air flow channel therebetween.

20. A dual-bed ventilation air regeneration system as set forth in claim 19, wherein:

when one of said first and second chemical beds is fluidically connected to said ventilation air loop such that ventilation air is conducted into said one of said first and second chemical beds from said ventilation air inlet manifold and withdrawn out from said one of said first and second chemical beds through said ventilation air outlet manifold, air flows through said first and fifth air flow channels and upwardly through said upper chemical bed portion from a lower end region thereof to an upper end region thereof so as to be discharged through said third air flow channel, and air also flows through said first and fifth air flow channels and downwardly through said lower chemical bed portion from an upper end region thereof to a lower end region thereof so as to be discharged through said fourth and second air flow channels.

21. A dual-bed ventilation air regeneration system as set forth in claim 19, wherein:

when one of said first and second chemical beds is fluidically connected to one of said exhaust ports of said valve spool housing such that air is withdrawn from said one of said first and second chemical beds through both said inlet and outlet manifolds of said one of said first and second chemical beds, air flows from an upper end region of said upper chemical bed portion through said third air flow channel, air flows from a lower end region of said upper chemical bed portion through said fifth and first air flow channels, air flows from an upper end region of said lower chemical bed portion through said fifth and first air flow channels, and air flows from a lower end region of said lower chemical bed portion through said fourth and second air flow channels.

* * * * *

UNITED STATES PATENT AND TRADEMARK OFFICE
CERTIFICATE OF CORRECTION

PATENT NO.    : 6,142,151
DATED         : November 7, 2000
INVENTOR(S)   : W. Clark Dean It is certified that error appears in the above-identified patent and that said Letters Patent is hereby corrected as shown below:

Column 1,
Line 3, insert the following paragraph:
-- The invention described herein was made in the performance of work under NASA Contract No. 9-19624 and is subject to the provisions of Section 305 of the National Aeronautics and Space Act of 1958, as amended (42 U.S.C. 2457). --

Signed and Sealed this

Twenty-seventh Day of January, 2004

JON W. DUDAS
*Acting Director of the United States Patent and Trademark Office*